United States Patent
Cozza et al.

(10) Patent No.: US 8,672,296 B2
(45) Date of Patent: Mar. 18, 2014

(54) APPARATUS FOR LIFTING PALLET RACKS

(76) Inventors: Frank Charles Cozza, Santee, CA (US); Gerry Taylor, Carlsbad, CA (US)

(*) Notice: Subject to any disclaimer, the term of this patent is extended or adjusted under 35 U.S.C. 154(b) by 886 days.

(21) Appl. No.: 12/359,262

(22) Filed: Jan. 23, 2009

(65) Prior Publication Data

US 2009/0183954 A1    Jul. 23, 2009

Related U.S. Application Data

(60) Provisional application No. 61/011,971, filed on Jan. 23, 2008.

(51) Int. Cl.
*B62B 3/06* (2006.01)

(52) U.S. Cl.
USPC .......................................... 254/2 R; 254/2 B

(58) Field of Classification Search
USPC ................... 254/2 R, 7 B, 9 B, 2 B
See application file for complete search history.

(56) References Cited

U.S. PATENT DOCUMENTS

| | | | | | |
|---|---|---|---|---|---|
| 4,362,458 | A | * | 12/1982 | Jantzi | 414/458 |
| 4,466,268 | A | * | 8/1984 | Matson, Sr. | 72/389.6 |
| 5,275,256 | A | * | 1/1994 | Ellzey | 182/103 |
| 6,644,626 | B2 | * | 11/2003 | Baril | 254/2 R |
| 2003/0160140 | A1 | * | 8/2003 | Nastase | 248/210 |
| 2003/0209387 | A1 | * | 11/2003 | Burr | 182/129 |

FOREIGN PATENT DOCUMENTS

EP    0504499 A1 *  3/1991 ............... B62B 3/02

* cited by examiner

*Primary Examiner* — Lee D Wilson
*Assistant Examiner* — Nirvana Deonauth
(74) *Attorney, Agent, or Firm* — Donn K. Harms

(57) ABSTRACT

A lifting device for warehouse shelving supported by closely spaced vertical members is provided. The device employs a pivotable bracket which engages the vertical member at a central position with a pin to allow the bracket to rotate to move the top of the bracket away from the vertical member and position the member in a gap in the bracket. In the rotated position the bracket is engageable to a plate whereupon the bracket is pivoted back parallel with the vertical member and engaged with a second pin. A jack lifts the plate thereafter to thereby lift the member and the shelf.

9 Claims, 4 Drawing Sheets

US 8,672,296 B2

APPARATUS FOR LIFTING PALLET RACKS

This application claims the benefit or U.S. Provisional Patent Application Ser. No. 61/011,971, filed Jan. 23, 2008, and incorporated herein in its entirety by reference.

BACKGROUND OF THE INVENTION

1. Field of the Invention

The present invention relates to relocation of display racks. More particularly it relates to a lifting apparatus which is especially adapted for lifting pallet style shelves employed in warehouses and warehouse style stores such as home improvement centers where pallets are stacked on large shelves.

2. Prior Art

Storage and display shelving in large warehouses is conventionally configured to hold pallets of products in large quantities. The same is true in warehouse type stores such as Costco and Home Depot where the products are sold in volume and moved in large lots on pallets. In order to conserve floor space in warehouse and retail situations and provide a better viewing and access to products, shelving is commonly provided that adapted to display the products to customers but accommodate the very heavy load which pallets and large quantities of products thereon impart to shelves.

In warehouses and stores where goods and products are stored for distribution or shipping, shelving is also employed to increase the storage capacity in the given floor space and to organize the inventory. Offices also use such pallet style shelving to hold records and display goods thereby concentrating storage in a small but heavy area.

All such shelving for pallets and large loads of products, whether in retail stores, warehouses, and offices, must be structurally able to support the load intended, making it heavy. Such shelving is even heavier when fully loaded with the products or items being stored on its shelves.

A vexing problem of such shelving by nature of its need to support a load is the weight and ungainly nature of the shelving when loaded with products for sale. The shelves loaded with products are inherently top heavy and easily tip over.

A variety of jacks and dollies have been introduced in the past, most of which pertain to the lifting of cabinets which have support legs with an adjustable leveling foot extending therefrom to level the shelves. However, most conventional lifting devices lack the ability generally to lift pallet type shelving which employs large steel vertical columns supporting large horizontal steel columns. Further, such industrial pallet type shelving is generally positioned directly in contact with the floor underneath and with vertical columns very close to adjacent vertical columns of other shelves.

Consequently, it is hard to get a jacking device under the columns which contact the floor, and very difficult to get a jacking device in-between adjacent vertical columns of adjacent shelves.

As such, there is a continuing unmet need for an improved lifting device for pallet type industrial shelving. Such a device should be easily engageable to vertical upright columns that are spaced very close together in a crowded warehouse environment. Such a shelving lifting device should also provide a strong, and stable engagement while lifting the heavy unstable shelving, to allow movement of the shelving with products on the shelves.

SUMMARY OF THE INVENTION

The device and method herein disclosed and described achieves the above-mentioned goals through the provision of an adaptive jack operated lifting system, which preferably employs a dolly mounted jack, to operatively engage an interface bracket which is adapted to rotatably engage vertical columns of shelving.

Employing the interface bracket, with the dolly mounted jack or another jack, in the disclosed system allows for a solid engagement of the jack and dolly to the elevated vertical columns of shelving. Further, by employing the interface bracket that pivots or tilts in its engagement to the vertical beams, the system allows for engagement of the dolly and jack, or another jack if used, to the very closely spaced vertical columns of shelving which heretofore was not obtainable.

The interface bracket is adapted to mechanically engage with vertical steel columns employed in pallet shelving using a pin sized to engage through aligned apertures in vertical columns, and through side walls of the U-shaped bracket. Engaging the bracket to the vertical column with a pin allows the bracket to pivot, or tilt away from the vertical column for a short distance into the small gap generally situated between such closely spaced vertical columns in a warehouse environment and thereby allow engagement of the dolly and a jack to lift the heavy shelves using the bracket.

A locking bracket plate is adapted to lock a plurality of pins through the tilting bracket and the vertical column and maintain the column in a locked engagement to the bracket. The bracket is maintained in a locked engagement to the dolly which has a jack engaged thereon to lift the bracket. A tail end of the bracket is adapted to hold the bracket parallel to the column once the dolly is engaged so that the dolly does not tilt away at its base once the load is communicated to the dolly by lifting the jack.

By employing the unique tilting bracket between the columns of the shelves and the narrow dolly with jack attached, an easy and solid engagement is achieved allowing for the shelving to be moved while loaded with products and then easily disengaged once finished.

Accordingly, it is an object of the invention to provide a device for lifting heavy industrial style pallet racks and displays.

Another object of this invention is to provide such a device which employs an interface bracket between the columns of the racks and shelving and the dolly lifting it to accommodate tight spacing.

A further object of this invention is to provide such a jack that may be manufactured as a single lifting mechanism including both a dolly and jack with the dolly adapted to engaged the interface bracket.

Yet another object of this invention is the provision of such a system where one dolly can accommodate a wide variety of pallet shelving and racks by the employment of an interface bracket adapted to engage the specific shelving columns with the dolly.

These together with other objects and advantages which become subsequently apparent reside in the details of the construction and operation as more fully hereinafter described and claimed, reference being had to the accompanying drawings forming a part thereof, wherein like numerals refer to like parts throughout.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims are regarded as including such equivalent construction and methodology insofar as they do not depart from the spirit and scope of the present invention.

BRIEF DESCRIPTION OF DRAWING FIGURES

DETAILED DESCRIPTION OF PREFERRED EMBODIMENTS OF THE INVENTION

Figure 1:
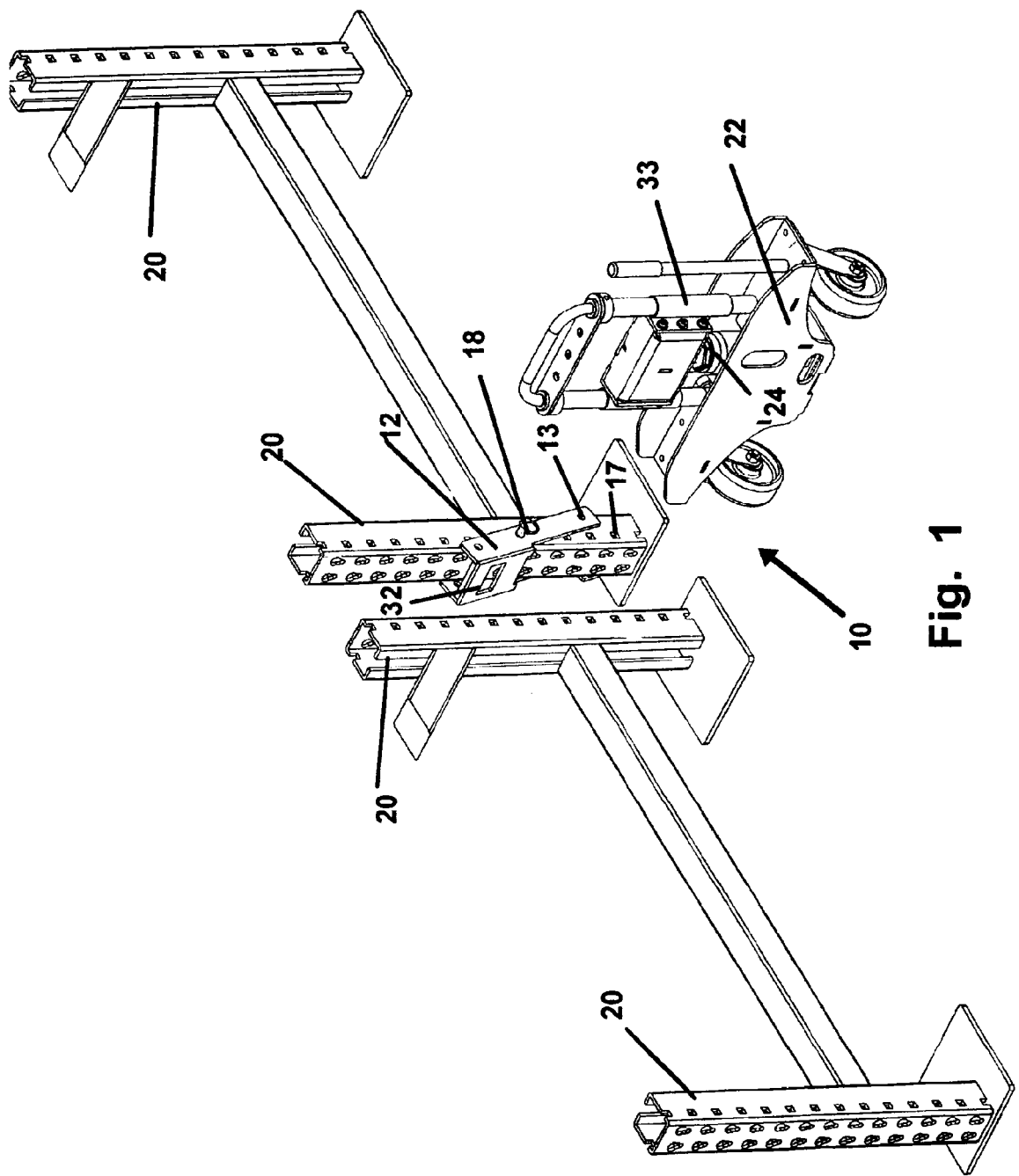
FIG. 1 depicts a perspective view of the dolly positioned for engagement to an interface bracket between two very closely positioned vertical support columns.
Figure 2:
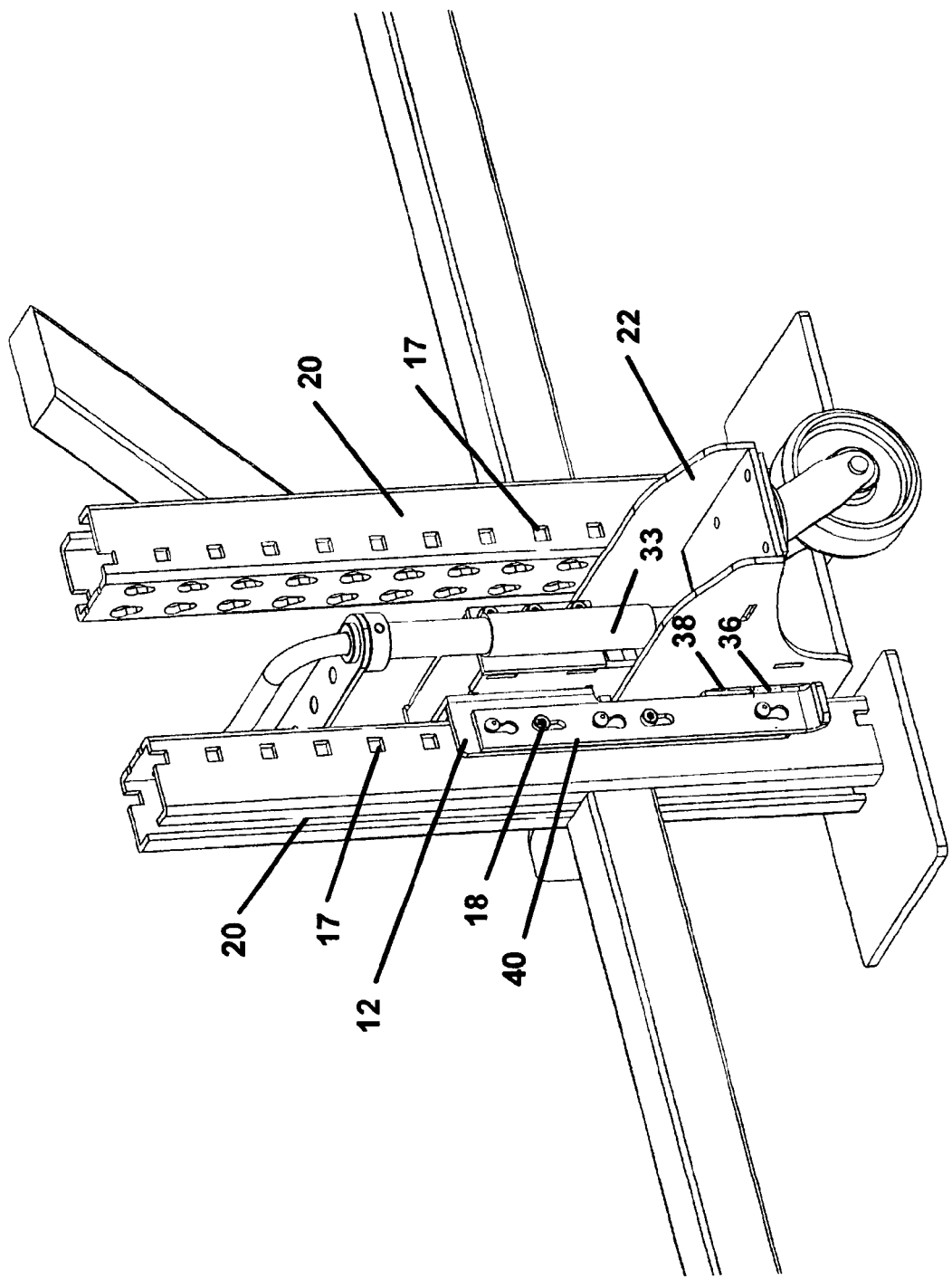
FIG. 2 shows the device engaged to a vertical column of conventional style pallet or industrial shelving.
Figure 3:
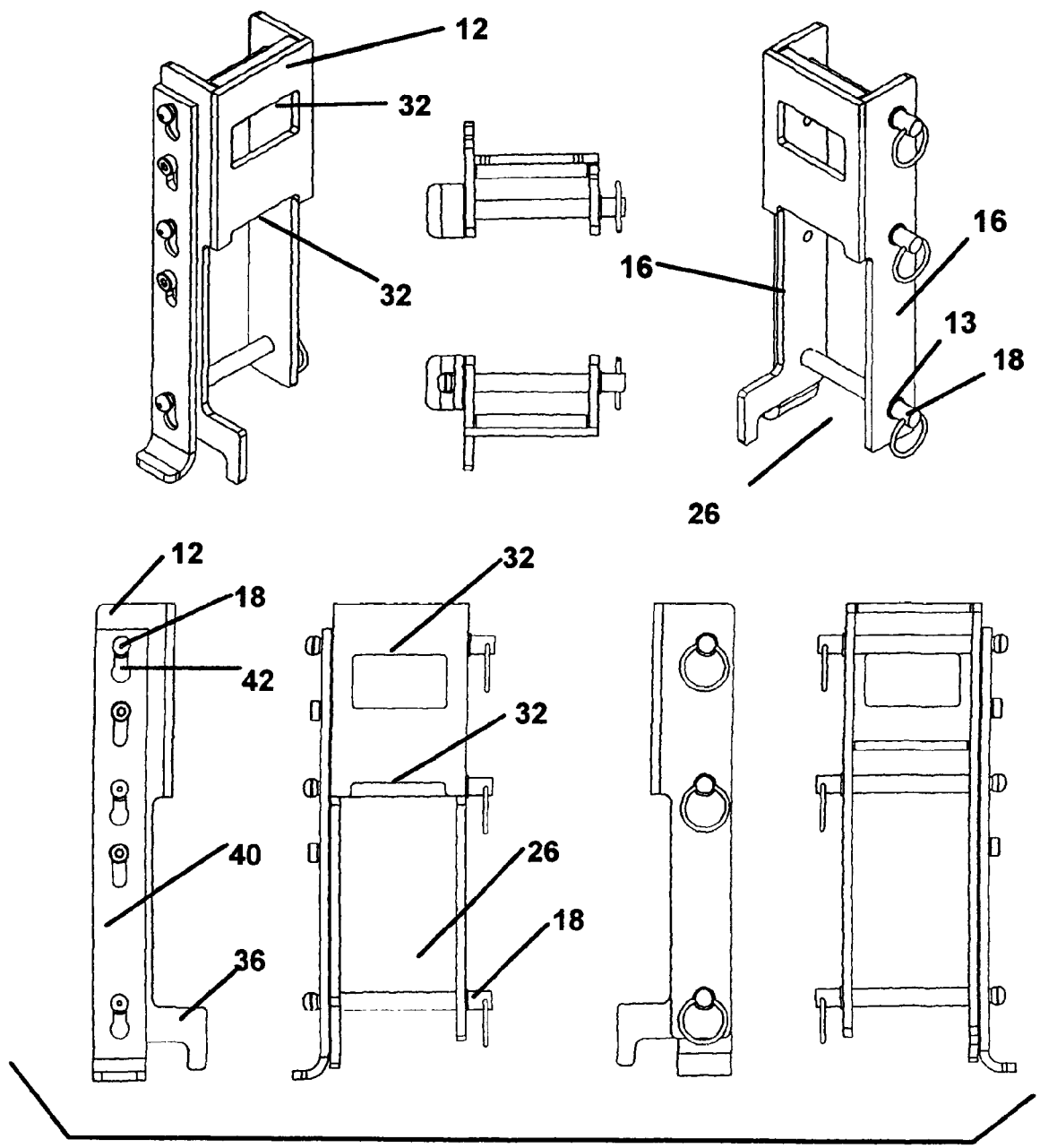
FIG. 3 depicts various views of the interface bracket showing the locking component and the tail portion for locking the bottom of the bracket to the dolly.
Figure 4:
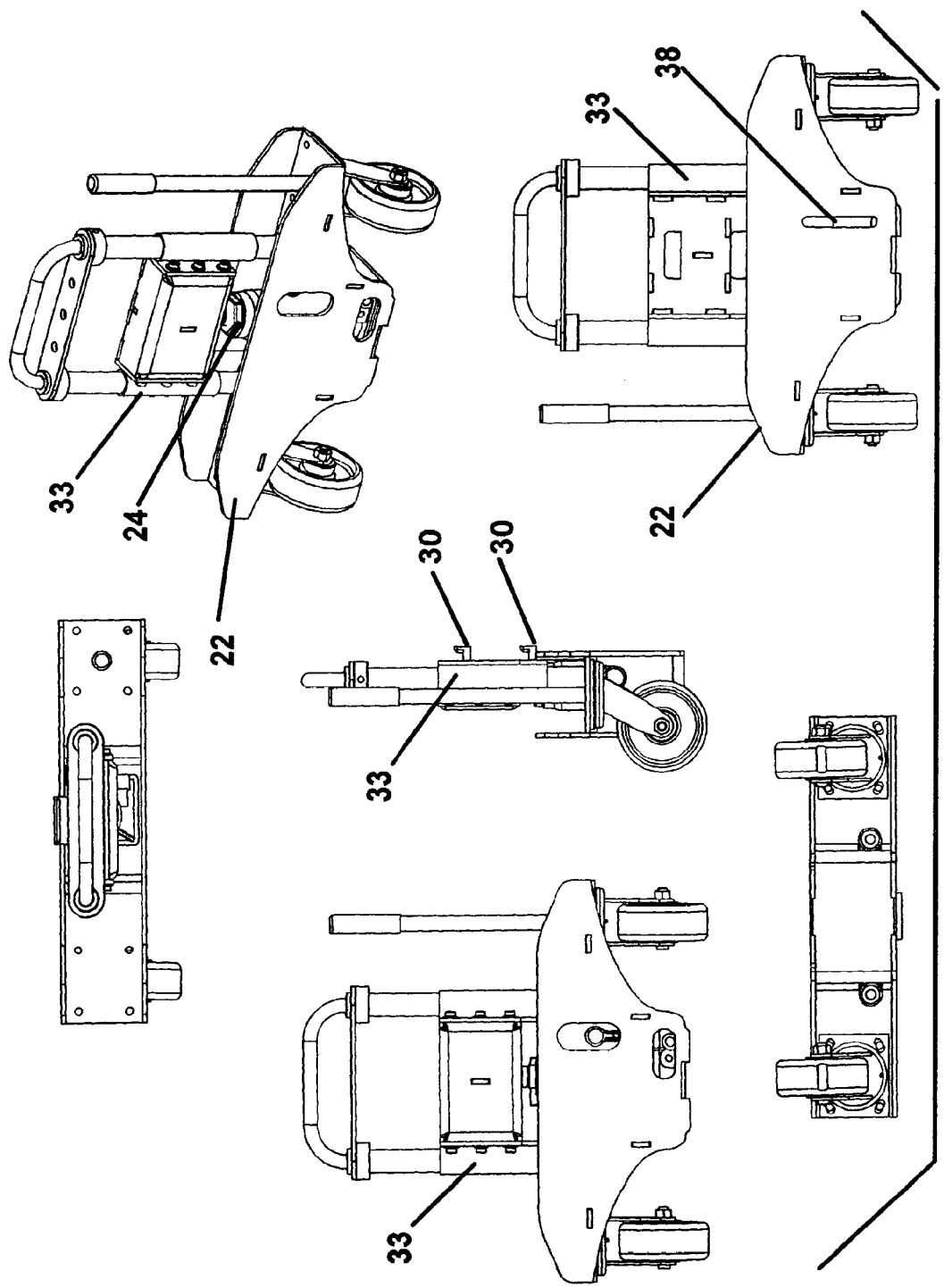
FIG. 4 depicts various views of the dolly with the jack of FIG. 3.

The device 10 forming the pallet rack lifting system, as depicted in FIGS. 1-4 features an interface bracket 12 which is generally U-shaped having two sidewalls 16 with aligned apertures therein adapted for engagement of pins 18 therethrough. Those skilled in the art will immediately ascertain the operational characteristics of the device 10 and method herein from viewing the drawings and components.

A gap between the sidewalls 16 is sized for a snug fit around a vertical support column 20 of a pallet type shelf or rack. This unique interface bracket 12 can be adapted on the first side to engage any style vertical support column 20 of any diameter so long as there are holes 17 in the vertical support column 20 which is conventional. The opposite side of the bracket 12 is adapted to engage a dolly 22 having a jack 24 mounted thereon. Thus, a single type of dolly 22 can be engaged to any number of different style vertical columns 20 by changing the configuration of the interface bracket 12.

The interface bracket 12 is adapted with a cutout 26 between the sidewalls 16 to allow it to tilt once it is engaged with a single pin 18 to a support column 20. This is most important because it positions the interface bracket 12 to be engaged with the dolly 22 using a pair of hooks 30 on the slidable carriage 33 of the dolly 22 to engage a pair of horizontal edges 32 on the interface 12. In use, the interface 12 would be engaged with one pin 18 and tilted out as in FIG. 1 to allow the dolly 22 to be positioned to engage the edges 32 on the bracket 12. As the carriage 33 of the dolly 22 is raised, the bracket 12 will tilt to a parallel position with the column 20 and a tail portion 36 will engage through a locking aperture 38 in the dolly 22. With the remainder of the pins 18 inserted through apertures 13 the bracket 12 and the column apertures 17 through the column 20, thereby holding the bracket 12 parallel to the column 20, the tail portion 36 acts to hold the bottom of the dolly 22 against the column 20 otherwise it might slide away under a load. This is most important to the stability of the system when moving a heavy shelf.

In use, each column 20 of the shelving being moved would be engaged first to an interface bracket 12, which would then be engaged to the dolly 22 by lifting the carriage 33 to a point where the tail 36 engages the slot 38 and the pins 18 can all be inserted through the bracket 12 and column 20. Thereafter as the jack on the dolly 22 lifts the carriage 33, the tail 36 maintains the dolly against the column 20. Each column 20 would be lifted in this manner and the entire shelf may be rolled at will once all are elevated. Removal would be in reverse.

A sliding lock plate 40 has keyhole style apertures 42 to lock the pins 18 in a fixed engagement through the bracket 12 and column 20 during use.

While all of the fundamental characteristics and features of the invention have been shown and described herein, with reference to particular embodiments thereof, a latitude of modification, various changes and substitutions are intended in the foregoing disclosure and it will be apparent that in some instance, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. An apparatus for lifting of shelving supported by vertical support columns positioned upon a support surface, comprising: a bracket, said bracket being substantially "U" shaped and having two parallel sidewalls engaged to a center wall; said center wall having a width allowing a positioning of said sidewalls adjacent to two parallel sides of a vertical support column for a shelf; said sidewalls having an aligned first pair of apertures at a central portion of said bracket between an upper and lower end of said bracket; a pin, said pin engageable through said first pair of apertures and through a passage in said vertical support column thereby positioning said bracket in an engaged position; a gap in said center wall at said lower end of said bracket said gap having a horizontally disposed edge; an aperture communicating through said center wall, said aperture having a horizontally disposed edge; said upper end of said bracket with said pin in said engaged position, pivotable from a first position with said center wall parallel and adjacent to a side surface of said support column, toward said lower end, to a rotated position, said support column communicating through said gap when said bracket is in said rotated position;

said bracket in said rotated position engageable to a pair of hooks extending from said plate carriage, said hooks positioned for an engagement with said horizontally disposed edge of said aperture or said gap; said bracket engaged to said carriage, rotatable back to said first position; said sidewalls of said bracket having a second pair of aligned apertures adjacent to said upper end of said bracket; a second pin, said second pin engageable through said second pair of aligned apertures and through a second passage in said vertical support column to thereby lock said bracket in said first position; and means to elevate said carriage, with said bracket in said first position and thereby elevate said support bream column above said support surface.

2. The apparatus for lifting of shelving of claim 1 additionally comprising: said plate carriage; translatably engaged to a base of a wheeled dolly; said means to elevate said carriage comprising a jack operatively engaged to said dolly and said carriage; and said dolly having wheels thereon extending from a base.

3. The apparatus for lifting of shelving of claim 1 additionally comprising: a locking plate, said locking plate having a plurality of keyhole apertures therein positioned to engaged notches in ends of said respective first and second pins engaged within said first and second pairs of apertures;
a first end of said keyhole apertures adapted to slide over said ends of said first and second pins to an attached position;
said locking plate in said attached position translatable to engaged second ends of said keyhole apertures with said notches in said ends of said pins; and
whereby said pins may be locked into position engaged with said bracket by said locking plate.

4. The apparatus for lifting of shelving of claim 2 additionally comprising: a locking plate, said locking plate having a plurality of keyhole apertures therein positioned to engaged notches in ends of said respective first and second pins engaged within said first and second pairs of apertures;
a first end of said keyhole apertures adapted to slide over said ends of said first and second pins to an attached position;
said locking plate in said attached position translatable to engaged second ends of said keyhole apertures with said notches in said ends of said pins; and
whereby said pins may be locked into position engaged with said bracket by said locking plate.

5. The apparatus for lifting of shelving of claim 1 additionally comprising:
said bracket having a third pair of apertures adjacent to said lower end of said bracket; and
a third pin, said third pin engageable through said third pair of apertures and through said one vertical support column.

6. The apparatus for lifting of shelving of claim 1 additionally comprising:
wherein said apparatus comprises a plurality of dollies each including a jack, wherein said bracket includes a plurality of Said brackets, wherein each jack on each dolly is engageable with one of the plurality of said brackets, wherein each one of the plurality of said brackets engages one of said vertical support columns supporting said shelving;
wherein said apparatus is adapted to allow said plurality of dollies, each including a jack engagable with one of said brackets engaging one of said vertical support columns of said shelving, to cooperate to lift said vertical support columns supporting said shelving above said support surface, thus allowing said vertical support column supporting said shelving and said shelving to be moved.

7. An apparatus for lifting of shelving supported by vertical support beams, comprising:
a bracket, said bracket being substantially "U" shaped and having two parallel sidewalls engaged to a center wall;
said center wall having a width to position said sidewalls adjacent to two parallel sides of one of said vertical support beams for said shelving;
said sidewalls having an aligned first pair of apertures at a central portion of said bracket between an upper and lower end of said bracket;
a pin, said pin engageable through said first pair of apertures and through a passage in the one vertical support beam thereby positioning said bracket in an engaged position;
a cutout in said center wall at said lower end of said bracket;
said upper end of said bracket pivotable with said pin in said engaged position from a first position with said center wall parallel and adjacent to a side surface of the one support beam, to a rotated position with said center wall non-parallel to the one support beam;
the one support beam communicating through said cutout when said bracket is in said rotated position;
said bracket in said rotated position engageable to a jack;
with said bracket engaged to said jack, said bracket being rotatable back to said first position;
said bracket having a second pair of apertures adjacent to said upper end of said bracket;
a second pin, said second pin engageable through said second pair of apertures and through a second passage in the one vertical support beam to thereby lock said bracket in said first position;
means to elevate the one Vertical support beam engaged with said bracket in said first position to thereby elevate the one support beam;
said jack having a pair of hooks extending therefrom; and
said hooks engageable with horizontal edges of cutouts communicating through said center wall when said bracket is in said rotated position.

8. A system for moving at least one shelf supported by a plurality of vertical support beams, comprising:
a plurality of apparatuses, wherein each of said plurality of apparatuses is adapted to cooperate with the others of said plurality of apparatuses to move said at least one shelf supported by said plurality said vertical support beams, wherein each apparatus of said plurality of apparatuses comprises:
a bracket, said bracket being substantially "U" shaped and having two parallel sidewalls engaged to a center wall;
said center wall having a width to position said sidewalls adjacent to two parallel sides of one of said vertical support beams for said at least one shelf;
said sidewalls having an aligned first pair of apertures at a central portion of said bracket between an upper and lower end of said bracket;
a pin, said pin engageable through said first pair of apertures and through a passage in the one vertical support beam thereby positioning said bracket in an engaged position;
a cutout in said center wall at said lower end of said bracket;
the one support beam communicating through said cutout when said bracket is in said rotated position;
said bracket in said rotated position engageable to a jack;
with said bracket engaged to said jack, said bracket rotatable back to said first position;
said bracket having a second pair of apertures adjacent to said upper end of said bracket;
a second pin, said second pin engageable through said second pair of apertures and through a second passage in the one vertical support beam to thereby lock said bracket in said first position; and
means to elevate the one vertical support beam with said bracket in said first position and thereby elevate the one support beam; wherein said jack on each apparatus is translatably engaged to a base of a wheeled dolly on each apparatus; said dolly on each apparatus having wheels thereon extending from said base; said jack on each apparatus having a pair of hooks extending therefrom; and said hooks engageable with horizontal edges of cutouts communicating through said center wall when said bracket on each apparatus is in said rotated position on each apparatus.

9. The system for moving at least one shelf supported by a plurality of vertical members of claim 8, wherein said bracket on each apparatus has a third pair of apertures adjacent to said lower end of said bracket on each apparatus; and a third pin on each apparatus, said third pin on each apparatus engageable through said third pair of apertures and through the one vertical support beam associate with each apparatus.

* * * * *